United States Patent [19]
Borchers

[11] Patent Number: 5,816,111
[45] Date of Patent: Oct. 6, 1998

[54] ACTUATOR FOR A HAND BRAKE OF A MOTOR VEHICLE

[75] Inventor: Wolf-Dieter Borchers, Remscheid, Germany

[73] Assignee: ED Scharwächter GmbH & Co. KG, Remscheid, Germany

[21] Appl. No.: 742,837

[22] Filed: Nov. 1, 1996

[30] Foreign Application Priority Data

Jan. 10, 1996 [DE] Germany .................. 196 00 582.5

[51] Int. Cl.⁶ ............................. G05G 5/18; B60T 7/08
[52] U.S. Cl. ................. 74/535; 74/538; 74/576; 74/577 S
[58] Field of Search ................. 74/535, 577 M, 74/576, 575

[56] References Cited

U.S. PATENT DOCUMENTS

| | | | |
|---|---|---|---|
| 3,652,124 | 3/1972 | Tronville | 296/146 |
| 3,939,729 | 2/1976 | Brockelsby | 74/577 M X |
| 4,596,310 | 6/1986 | Hatakeyama | 74/577 M X |
| 4,819,501 | 4/1989 | Kraus et al. | 74/535 X |
| 5,001,942 | 3/1991 | Boyer | 74/535 |
| 5,154,476 | 10/1992 | Haider et al. | 74/575 X |
| 5,205,184 | 4/1993 | Noel et al. | 74/535 X |
| 5,272,935 | 12/1993 | Heinenmann | 74/535 |

FOREIGN PATENT DOCUMENTS 805040 11/1958 United Kingdom .................. 74/535

*Primary Examiner*—Rodney H. Bonck
*Assistant Examiner*—William C Joyce
*Attorney, Agent, or Firm*—Anderson, Kill & Olick, P.C.

[57] ABSTRACT

An actuator for a cable-controlled hand brake of a motor vehicle including a ratchet carrier attached to the vehicle body, a brake actuating lever hingedly supported on the ratchet carrier, a spring-biased drive pawl formed as a rocker and having a circumferential toothing, a cable-supporting drive disc coupleable with the brake actuating lever and cooperating with the drive pawl, and a locking device including a toothed segment formed on the stationary ratchet carrier, and a locking pawl supported on the actuating lever, with the locking pawl being formed as a two-part locking pawl with the two parts being hingedly supported on the brake actuating lever for pivotal movement about a common axis independently of each other, and the two parts being automatically mechanically connectable with each other upon pivoting in at least one of their pivotal directions.

11 Claims, 4 Drawing Sheets

ACTUATOR FOR A HAND BRAKE OF A MOTOR VEHICLE

BACKGROUND OF THE INVENTION

1. Field of the Invention

The present invention relates to an actuator for a cable-controlled hand brake of a motor vehicle and which includes a ratchet carrier attached to the vehicle body, a brake actuating lever hingedly supported on the ratchet carrier, a drive pawl spring-biased in a pulling direction of a hand brake cable, formed as a rocker and having a circumferential toothing, a cable-supporting drive disc coupleable with the brake actuating lever and cooperating with the drive pawl, and a locking device including a toothed segment formed on the stationary ratchet carrier, and a locking pawl supported on the actuating lever.

2. Description of the Prior Art

Generally, in conventional lever-actuated hand brakes of motor vehicles, the brake actuating lever is pivotally supported on a ratchet carrier formed of a steel sheet stamping and fixedly attached to a vehicle body. The brake actuating lever is connected with the cable take-up part, in particular with a cable take-up disc, as long as the hand brake is not a servo-brake. For locking the applied brake in its complete or partial operating position and, if necessary, in its release position, the brake actuating lever is associated with a corresponding locking mechanism. The locking mechanism is usually released by a spring-biased push button provided in the handle of the brake actuating lever. The locking mechanism includes a toothed segment provided on the ratchet carrier and concentrically to the hinge axis of the brake actuating lever, and a pivotal locking pawl supported on the brake actuating lever. The push button is connected with the locking pawl by a linkage including a push rod located inside of the brake actuating lever. Because with such construction of a hand brake, the push rod, which connects the push button with the locking pawl, is biased in a released direction with a relatively large biasing force in order to prevent jamming of the push rod or the push button against the body of the brake actuating lever and any damage which may be caused thereby, the locking pawl, naturally, is constantly biased in a direction of its locking position with likewise a relatively large force. This results in that during actuation of the hand brake, a very high undesirable noise rattling of the locking pawl over the toothed segment toothing takes place. Furthermore, in cable-controlled brakes, during the operational life of the brake, wear of braking linings takes place and, as a result, some elongation of the control cable. As a result, with time, the brake actuating lever acquires an ever increasing lost motion. In the course of the operational life of the adjustments necessary to compensate the hand brake, the elongation of the control cable and the wear of the brake lining also naturally lead to an increase of noise during actuation of the brake.

Accordingly, an object of the present invention is an actuator for a hand brake, in particular a cable-controlled hand brake which would generate a minimum noise when the brake is applied, while insuring an absolutely reliable locking of the brake in its completely or partially applied position.

SUMMARY OF THE INVENTION

This and other objects of the present invention, which will become apparent hereinafter, are achieved by providing an actuator of the above-described type in which the locking pawl is formed as a two-part locking pawl, with the two parts being hingedly supported on the brake actuating lever for pivotal movement about a common axis independently of each other, and with the parts automatically becoming mechanically connectable with each other upon pivoting in at least one of their opposite pivotal directions.

By dividing the locking pawl into two parts or halves which are displaceable relative to each other, a separation of spring-biasing forces acting on of the push rod and the locking pawl half, which cooperates with the toothed segment in one of the pivotal directions of the locking pawl, is achieved. This separation permits to apply to the push button and the push rod, on one hand, and to the locking pawl part or half, on the other hand, different corresponding spring-biasing forces. The present invention contemplates applying to the push button and the push rod a sufficiently strong force to reliably prevent jamming of the push rod inside the brake actuating lever. At the same time, a relatively weak force can be applied to the locking pawl part which cooperates with the toothed segment. The force applied to the locking pawl half cooperating with the toothed segment should be so selected that a reliable engagement of the locking pawl half with the toothed segment takes place during the application of the brake.

There exist different ways of implementing the present invention. According to one of the preferred embodiments of the present invention, one of the locking pawl halves or parts is coupled to one-piece rectilinear push rod, which forms part of a linkage connecting the locking pawl with the push button and which is fixedly connected with the push button. The push rod is continuously biased to the hand brake release position by a spring, supported on the brake actuating lever. At the same time, the other locking pawl part or half has, at a free end thereof, a detent tooth which, in an applied position of the hand brake, engages the toothed segment, independent of the first locking pawl part, under the action of its own loading spring. The spring acting on the second rocking pawl part is advantageously formed as a leg spring, which is supported on the brake actuating lever and the spiral of which is arranged concentrically with respect to the hinge axis of the two parts or halves of the locking paw. However, the spring acting on the second locking pawl part may also be formed as a leg spring.

For releasing of the hand brake with the brake actuating lever, it is provided that the both locking pawl parts, upon being pivoted in the direction corresponding to the release of the hand brake, are automatically fixedly connected with each other by catch means provided on the first locking pawl part. According to one of the preferred embodiment of the present invention, the first locking paw part is formed as a two-arm lever, and the catch provided at a free lever arm end is formed as a nose extending parallel to a hinge axis of the first locking pawl part, and the second locking pawl part is formed as a one-arm lever and is provided with a detent recess complementary to the nose.

In a particularly preferred embodiment of the present invention the first locking pawl part has, in a region of a support thereof, an axially extending cavity, which is concentric to the hinge axis, and the second locking pawl part has a substantially circular head portion, likewise concentric to the hinge axis and receivable in the cavity of the first locking pawl part.

In another embodiment of the present invention, the first locking pawl part is formed as a two-arm lever, and the second locking pawl part is formed as a one-arm lever, and the two parts have in the region of their support a reduced material thickness.

In yet another embodiment of the present invention, the first locking pawl part is formed as a one-arm lever and the second locking pawl part is formed as a two-arm lever, with one of the first and second parts being provided with a catch formed as a nose which is sidewise offset with respect to a plane of the one part, and another of the first and second parts has a complimentary stop. When the stop is provided on the first lacking pawl part, which is connected with the push rod, the stop is provided in the region between its hinged attachment and its attachment to the push rod.

At that, at lease one and, preferably, both locking pawl parts is (are) formed as a metal sheet stamping(s). Alternatively, at least one or both locking pawl parts can be formed as moldings. At that, to further reduce noise, one of the two parts can be formed of a plastic material.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
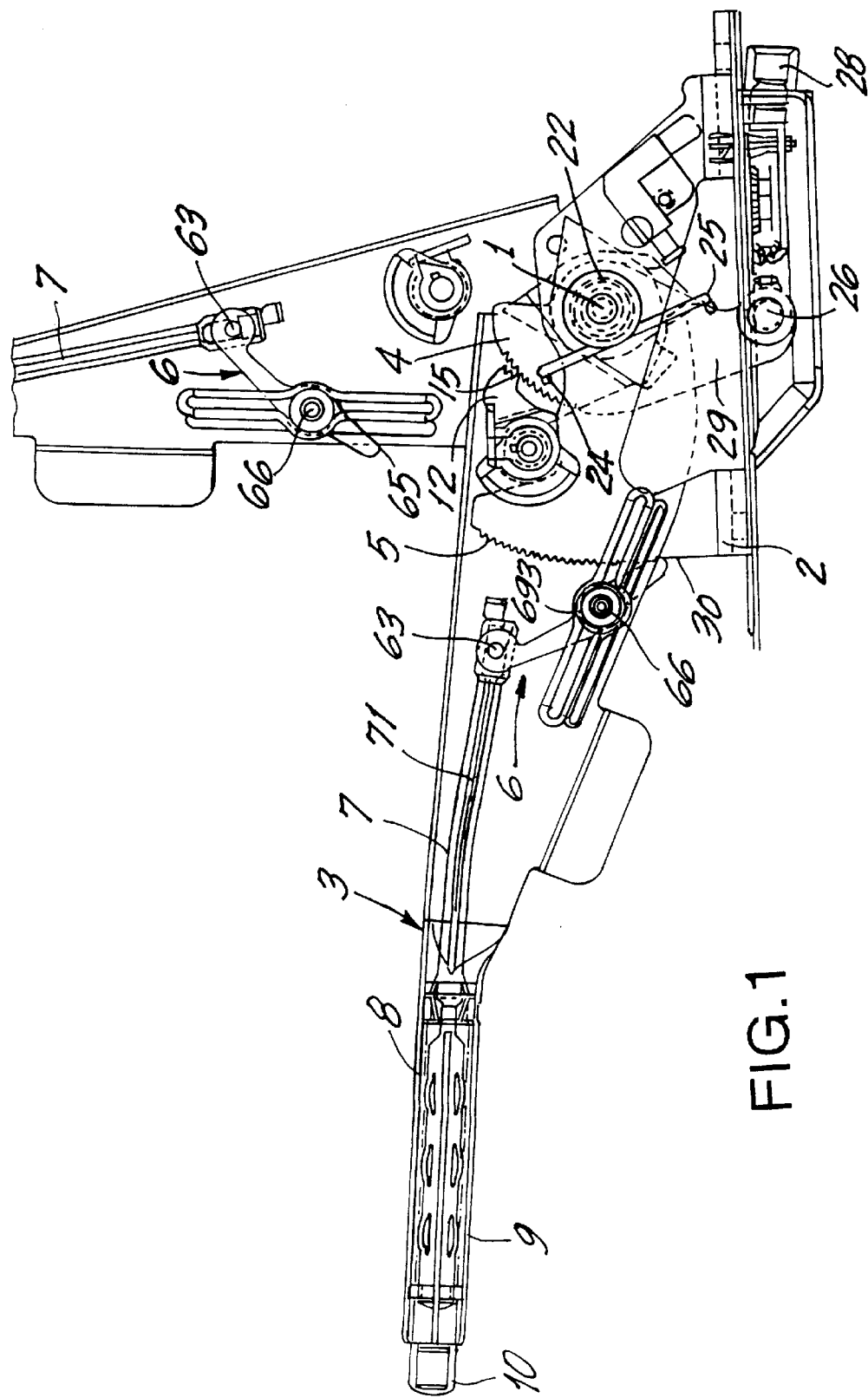
FIG. 1 is a side view of an actuator for a cable-controlled hand brake according to the present invention.
Figure 2:
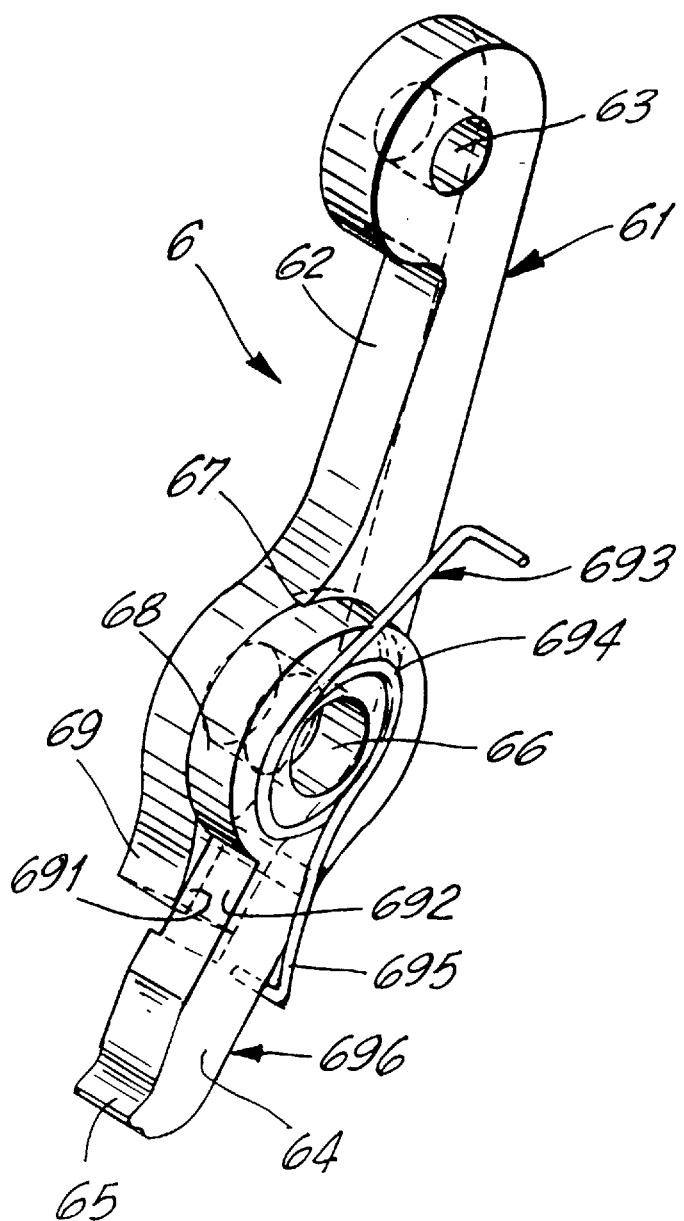
FIG. 2 is a perspective view of a two-part locking pawl used with the actuator according to the present invention.

An actuator for a cable-controlled hand brake for a motor vehicle according to the present invention essentially consists of a brake actuating lever 3, which pivots about a pivot axle 1 and is hingedly attached to a ratchet carrier 2 formed of a steel sheet stamping and fixedly attached to a vehicle body which is not shown in the drawing in detail, and a cable pulley 4 coupleable with the actuating lever 3. For locking the hand brake in its applied position and, in case it is necessary, in its release position, a toothed segment 5, which is concentrically arranged with respect to the pivot axis 1, is provided on the ratchet carrier 2. A locking pawl 6 cooperates with the toothed segment 5 for locking the hand brake in a predetermined position. The locking pawl 6 is displaceable into engagement with the toothed segment 5 by applying pressure to a push button 10 which is arranged in the region of a handle 9. The pressure applied to the push button 10 is transmitted to the locking pawl 6 by a linkage 7 provided in the body of the brake actuating lever 3. The linkage 7 includes a push rod 71 which is biased against the body of the actuating lever 3 by a spring 8. The locking pawl is formed of two parts and includes a first pawl half 61 formed as a two-arm lever, and a second pawl half 64 formed as a one-arm lever. The first pawl half 61 is connected with the push rod 71 by a link 63, and the second pawl half 64 is provided, at its free end, with a detent tooth 65 which cooperates with the toothing of the toothed segment 5. The two pawl halves 61 and 64 rotate about a common axis 66 independently of each other. The two pawl halves 61 and 64 are hingedly attached to the body of the actuating lever 3. Upon pivoting in a direction corresponding to the release of the hand brake, the two pawl halves 61 and 64 are automatically rigidly coupled with each other. To this end, the first pawl half 61 is provided with a recess 67, which is concentric with the common axis 66, and the second pawl half 64 is provided with a corresponding head 68, with the free lever arm 69 of the first pawl half 61 being provided with a nose 691 which cooperates with a detent recess 692 provided in the second pawl 64. The nose 691 extends parallel to the common axis 66. The push rod 71 is axially biased against the body of the actuating lever 3 by the relatively strong spring 8 when the second, one-arm pawl half 64 is biased to its engagement position by a relatively weak leg spring 693 supported against the body of the actuating lever 3. The leg spring 693 engages the back surface 696 of the second pawl half 64 with its spring leg 695, and has a loop portion 694 which is concentric to the common axis 66.

The actuator according to the present invention further includes a drive pawl 12 supported on the actuating lever 3 for pivotal movement about an axis 11. The drive pawl 12 is biased by a leg spring supported on the actuating lever 3 and cooperates with a drive disc 4 provided with a circumferential toothing. The drive pawl 12 is formed as a rocker and is provided with detent teeth 15 which cooperate with the drive disc 4 in the drive direction. The detent teeth 15 of the drive pawl 12 converge toward each other. A spiral spring 22, which has one of its end 24 attached to the drive disc 4 and the other of its end 25 supported against the ratchet carrier 2 which supports the drive axle of the drive disc 4, biases the drive disc 4 in a winding direction. The brake actuating lever 3 is biased in its release direction by a return spring (not shown in the drawings). The toothed segment 5 of the ratchet carrier 2 had, in the region of the release position of the actuating lever 3, a number of teeth 30, which are blocked in the view shown in FIG. 1, which cooperate with the return spring and which are capable of overrunning the pawl 6 under the action of a return spring 27. A braking cable 28 is connected with the drive disc 4 at 25 by a conventional suspension means. To this end, the drive disc 4 is provided with a corresponding projection.

Figure 3:
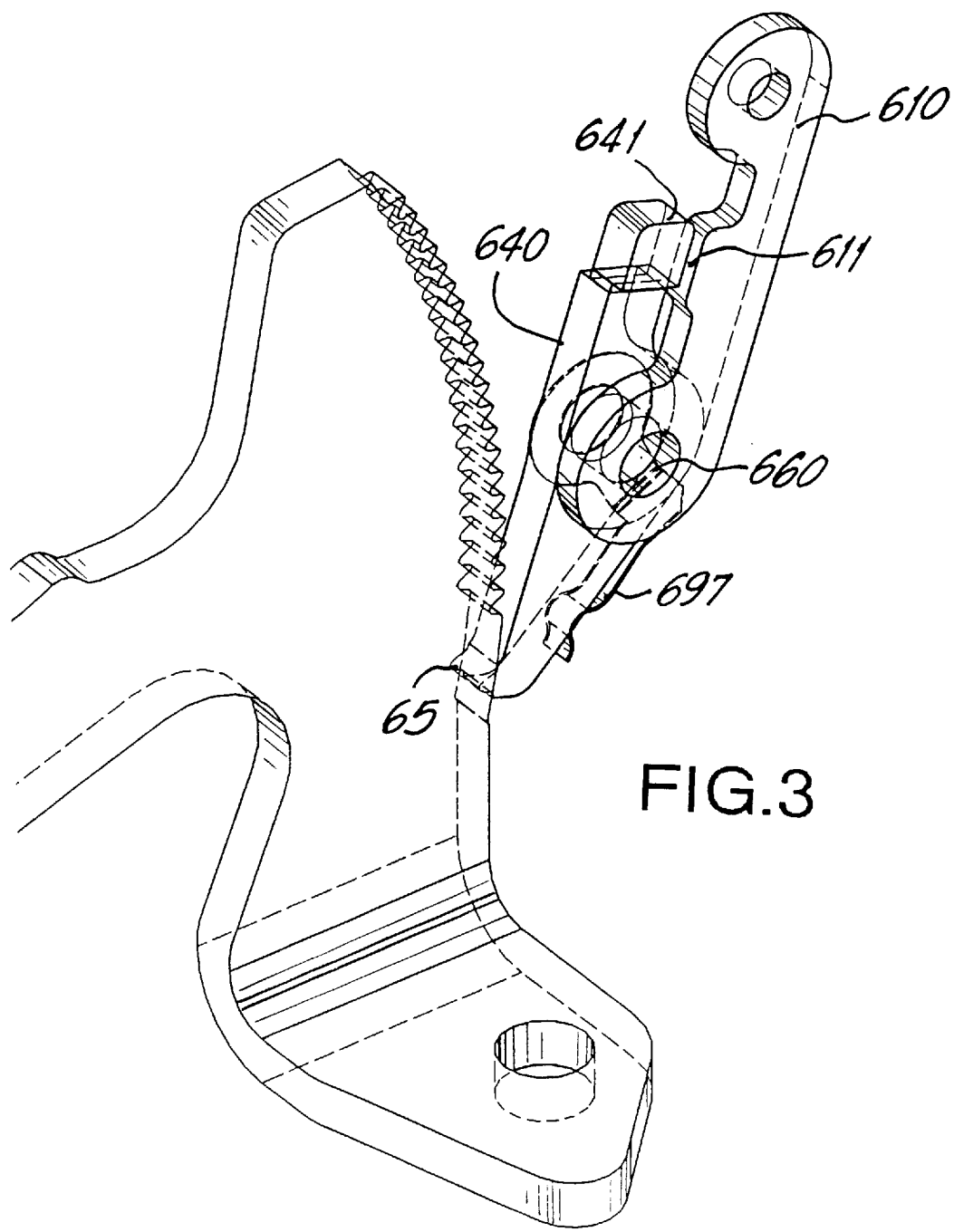
FIG. 3 is a perspective view of a first modified embodiment of a two-part locking pawl used with an actuator according to the present invention.
Figure 4:
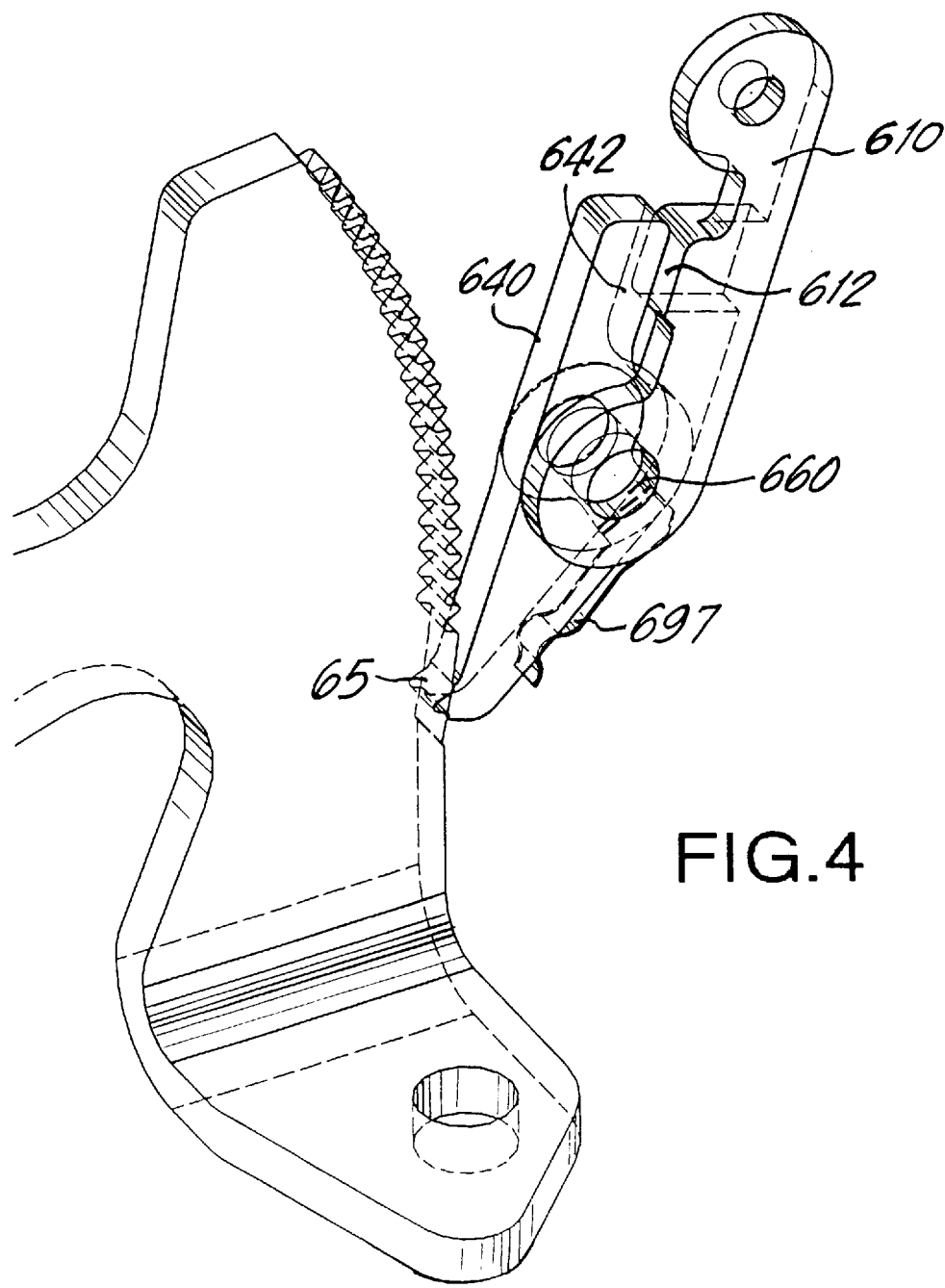
FIG. 4 is a perspective view of a second modified embodiment of a two-part locking pawl used with an actuator according to the present invention.

In the embodiments of the actuator according to the present invention, which is shown in FIGS. 3 and 4, it is the first locking pawl half 610 which is formed as a one-arm lever, and the second locking pawl half is formed as a two-arm lever. The two pawl halves 610 and 640, which pivot independently of each other about a common axis 660, are hingedly attached to the body of the actuating lever 3 and, upon their movement in a direction corresponding to the release of the hand brake, become automatically coupled with each other by means of an appropriate stop device.

In the embodiment shown in FIG. 3, a nose 641 is provided on the two-arm lever 640. The nose 641 is sidewise offset with respect to the first pawl half 610. The first pawl half 610 is provided with a stop surface 611 complementary to the nose 641.

In the embodiment shown in FIG. 4, it is the second pawl half 640 which is provided with a stop surface 642, and the first pawl half is provided with a complementary nose 612.

In the embodiments shown in FIGS. 3 and 4, a loading spring, which is associated with the second pawl half, is formed as a leaf spring 697 supported against the actuating lever 3.

Through the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An actuator for a cable-controlled hand brake of a motor vehicle, comprising:

a ratchet carrier attached to the vehicle body;

a brake actuating lever hingedly supported on the ratchet carrier;

a cable-supporting drive disc coupleable with the brake actuating lever and having circumferential toothing thereon;

a drive pawl formed as a rocker and having a plurality of detent teeth cooperating with the toothing provided on the drive disc, the drive pawl being actuated in response to movement of the actuating lever in a braking direction;

spring means for biasing the drive pawl in the braking direction;

a locking device including a toothed segment provided on the stationary ratchet carrier, and a locking pawl supported on the actuating lever; and means for displacing the locking device to a release position thereof;

wherein the locking pawl is formed as a two-part locking pawl;

wherein the two parts are hingedly supported on the brake actuating lever for pivotal movement about a common axis independently of each other;

wherein the two parts automatically become mechanically connectable with each other upon pivoting in at least one pivotal direction thereof;

wherein the displacing means comprises a push button projecting from a body of the actuating lever, and a linkage including a rectilinear push rod fixedly connected with the push button and located inside the actuating lever; and wherein a first locking pawl part is coupled to the push rod.

2. An actuator as set forth in claim 1, wherein the push button is constantly biased in an extended position from the body of the actuating lever by a compression spring supported on the actuating lever.

3. An actuator as set forth in claim 1, wherein a second locking pawl part is provided at a free end thereof with a detent tooth for engaging a stationary toothed segment.

4. An actuator as set forth in claim 3, wherein the first locking pawl part is provided with a catch for rigidly mechanically connecting the two parts upon pivotal movement thereof in the at least one pivotal direction.

5. An actuator as set forth in claim 4, wherein the first locking pawl part is formed as a two-arm lever, and the catch is provided at a free lever arm and is formed as a nose extending parallel to a hinge axis of the first locking pawl part, and wherein the second locking pawl part is provided with a detent recess complimentary to the nose.

6. An actuator as set forth in claim 3, wherein the second locking pawl part is formed as a one-arm lever, and wherein the locking device further include a leg spring supported against the brake actuating lever for biasing the second locking pawl part into engagement with the stationary toothed segment.

7. An actuator as set forth in claim 3 wherein the first locking pawl part has, in a region of a common hinge axis thereof, an axially extending cavity, which is concentric to the hinge axis, and the second locking pawl part has a substantially circular head portion, likewise concentric to the hinge axis and receivable in the cavity of the first locking part.

8. An actuator as set forth in claim 3, wherein the first locking pawl part is formed as a two-arm lever, and the second locking pawl part is formed as a one-arm lever and wherein the two parts have, in a region of common hinge axis thereof, a reduced material thickness.

9. An actuator as set forth in claim 3, wherein the first locking pawl part is formed as a one-arm lever, and the second locking pawl part is formed as a two-arm lever, and wherein one of the first and second parts is provided with a catch formed as a nose which is sidewise offset with respect to a plane of the one of the first and second parts, and another of the first and second parts has a complimentary stop.

10. An actuator as set forth in claim 1, wherein both locking pawl part are formed of steel sheet stampings.

11. An actuator as set forth in claim 1, wherein at least one of the two locking pawl parts is formed as a molding.

* * * * *